(12) United States Patent
Edwards et al.

(10) Patent No.: US 9,527,173 B2
(45) Date of Patent: Dec. 27, 2016

(54) ALIGNMENT TOOL FOR USE IN ALIGNING OPENINGS IN STRUCTURAL MEMBERS

(71) Applicants: James B. Edwards, Sanford, FL (US); Cezar Cisloiu, Monroeville, PA (US)

(72) Inventors: James B. Edwards, Sanford, FL (US); Cezar Cisloiu, Monroeville, PA (US)

(73) Assignee: Siemens Energy, Inc., Orlando, FL (US)

( * ) Notice: Subject to any disclaimer, the term of this patent is extended or adjusted under 35 U.S.C. 154(b) by 563 days.

(21) Appl. No.: 13/893,375

(22) Filed: May 14, 2013

(65) Prior Publication Data

US 2014/0338165 A1 Nov. 20, 2014

(51) Int. Cl.
- *B23P 19/10* (2006.01)
- *B23P 19/04* (2006.01)
- *F01D 25/24* (2006.01)
- *F01D 25/28* (2006.01)

(52) U.S. Cl.
CPC ............ *B23P 19/10* (2013.01); *F01D 25/243* (2013.01); *F01D 25/285* (2013.01); *Y10T 29/5383* (2015.01); *Y10T 29/53848* (2015.01); *Y10T 29/53978* (2015.01)

(58) Field of Classification Search
CPC ......... B23P 19/10; B23P 19/04; B23P 11/005; B25B 27/16; F01D 25/243; F01D 25/285; Y10T 29/5383; Y10T 29/53848; Y10T 29/53978; B29C 65/7805; F16L 1/10; F16L 37/1205; B23Q 17/2442; B23Q 17/2457
USPC .................................................. 29/271, 272
See application file for complete search history.

(56) References Cited

U.S. PATENT DOCUMENTS

| | | | | |
|---|---|---|---|---|
| 1,435,887 A * | 11/1922 | Anderson | | 29/271 |
| 2,350,404 A * | 6/1944 | Liston | | 254/100 |
| 2,352,290 A * | 6/1944 | Saul et al. | | 254/100 |
| 2,393,795 A * | 1/1946 | Miller | | 254/100 |
| 3,015,883 A * | 1/1962 | Brown | | F16L 1/10 29/271 |
| 3,661,408 A * | 5/1972 | Gibbons | | 285/18 |
| 3,925,854 A * | 12/1975 | McFadden | | B23K 37/0533 219/161 |
| 4,150,477 A * | 4/1979 | Orr | | 29/525.08 |
| 4,718,208 A * | 1/1988 | Fons | | E04H 7/30 220/565 |
| 4,769,889 A * | 9/1988 | Landman et al. | | 29/237 |
| 4,872,709 A * | 10/1989 | Stack | | 285/39 |
| 5,094,435 A * | 3/1992 | Depperman | | B23K 37/0536 269/43 |
| 5,129,136 A * | 7/1992 | Richardson | | 29/426.5 |

(Continued)

*Primary Examiner* — Joseph J Hail
*Assistant Examiner* — Arman Milanian (57) ABSTRACT

An alignment tool (100) aligns a first opening (416A) in a first member (30A) with a second opening (417A) in a second member (30D) to receive a fastener to couple the members. First (102) and second (103) lugs extend from a back plate (101). A first pin (104) is received within a first lug opening (102C) and within a third opening (408A) in the first member (30A). Similarly a second pin (108) is received within a second lug opening (103A) and within a fourth opening (409A) in the second member (30D). The third (408A) and fourth (409A) openings are proximate respective first (416A) and second (417A) openings. Reducing the distance between the back plate (100) and the first pin (104) displaces the third opening (408A) toward the back plate (100) to align the first (416A) and second (417A) openings.

19 Claims, 5 Drawing Sheets

(56) References Cited

U.S. PATENT DOCUMENTS

| | | | | |
|---|---|---|---|---|
| 5,228,181 A * | 7/1993 | Ingle | ................................ | 29/272 |
| 5,560,091 A * | 10/1996 | Labit, Jr. | ................. | B25B 27/16 |
| | | | | 269/43 |
| 5,832,582 A * | 11/1998 | Stephen | ................. | B25B 27/16 |
| | | | | 29/271 |
| 6,327,763 B2 * | 12/2001 | Stephen | ......................... | 269/43 |
| 6,513,216 B2 | 2/2003 | Stephen | | |
| 6,568,712 B1 * | 5/2003 | Aaron, III | ....................... | 285/24 |
| 6,955,224 B2 * | 10/2005 | Watson | ......................... | 166/379 |
| 7,703,215 B1 * | 4/2010 | Sanchez | ......................... | 33/645 |
| 9,316,335 B2 * | 4/2016 | Hall | ...................... | F16L 23/036 |
| 2010/0307000 A1 * | 12/2010 | Herbold | .................... | F23R 3/60 |
| | | | | 29/888 |
| 2012/0174363 A1 * | 7/2012 | Shen | .............................. | 29/253 |
| 2012/0286119 A1 * | 11/2012 | Scott | .......................... | 248/309.1 |
| 2013/0283583 A1 * | 10/2013 | Wasileski | ............... | B23P 19/10 |
| | | | | 29/257 |

* cited by examiner

ALIGNMENT TOOL FOR USE IN ALIGNING OPENINGS IN STRUCTURAL MEMBERS

FIELD OF THE INVENTION

This invention is directed generally to a tool for aligning an opening on first structural member with an opening on a second structural member, and more particularly to a tool for aligning flanges of a gas turbine exhaust diffuser.

BACKGROUND OF THE INVENTION

A gas or combustion turbine is a type of internal combustion engine. Air is compressed within a compressor and fuel is injected into the air stream in a combustor or combustion chamber where ignition occurs. Ignition of the fuel creates a high-pressure and high-velocity gas flow that is directed to a turbine, causing it to rotate.

Air is supplied to a diffuser having a larger cross-sectional area at a diffuser exit than at a diffuser entrance. Air exiting the diffuser has both a lower velocity and lower dynamic pressure than incoming air. The diffuser opens directly into the compressor where the air is compressed and accelerated.

The compressed air is directed to the combustion chamber comprising a ring of fuel injectors that direct fuel into the compressed air stream to ignite the air/fuel mixture. Ignition increases both the temperature and pressure of the air/fuel mixture (also referred to as a working gas). Most gas turbines are designed to combust a broad range of hydrocarbon fuels, such as natural gas, kerosene, biomass gas, liquid natural gas, synthetic gas, etc.

The working gas expands as it enters the turbine, which includes rows of stationary guide vanes and rotating blades connected to a turbine shaft. The expanding gas flow is accelerated by the guide vanes and directed over the rotating blades, causing the blades and the turbine shaft to spin. The spinning shaft both turns the compressor and provides a mechanical torque output. Energy can be extracted from the turbine in the form of shaft power, compressed air, thrust or any combination of these for use in powering aircraft, trains, ships and electric generators.

After passing through the turbine, the working gas flow enters a turbine exhaust casing comprising an exhaust gas diffuser and a nozzle through which the exhaust gases flow.

Figure 1:
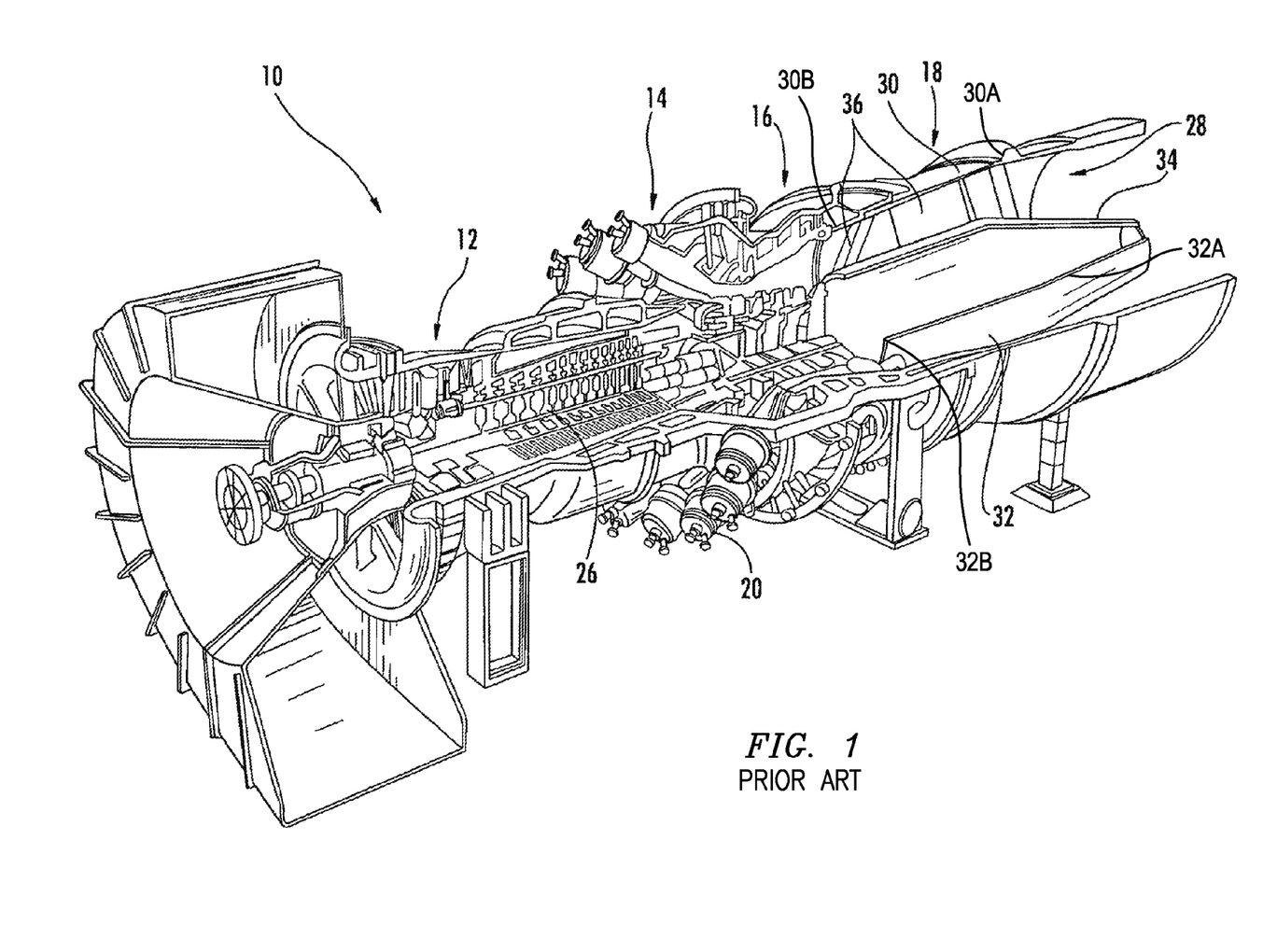
FIG. 1 is a cut-away view of a prior art gas turbine engine.

Referring to prior art FIG. 1, a gas turbine 10 generally includes a compressor 12, a combustion chamber 14, a turbine 16 and an exhaust casing 18. The compressor 12 inducts and compresses ambient air. The compressed air then enters one or more combustors 20 in the combustion chamber 14, where the compressed air is mixed with fuel. The air-fuel mixture ignites to form a hot working gas. The working gas is directed to the turbine 16 where it expands through alternating rows of stationary guide vanes and rotating blades to generate mechanical forces that turn a shaft 26. The expanded gas exiting the turbine 16 is exhausted from the engine 10 via the exhaust casing 18.

According to one implementation, the exhaust casing 18 comprises an exhaust diffuser 28, i.e., a divergent duct formed by an outer shell 30 and a center body or hub 32, and further comprises a tail cone 34. Support struts 36 span the space between and are affixed to the outer shell 30 and the hub 32. The exhaust diffuser 28 is shaped to reduce the speed of the exhaust flow and to increase the pressure of the exhaust gas exiting the exhaust casing 18. In some prior art turbine exhaust gas casings, this exhaust diffusion is achieved by progressively increasing the cross-sectional area of the exhaust duct in the direction of fluid-flow, thereby expanding the fluid during transit though the exhaust gas casing 18.

In one embodiment the outer shell 30 is about 13 feet in diameter and about 14 feet long. The center hub is about 6 feet in diameter at the largest diameter and about 14 feet long.

Typically, upstream sections of the outer shell 30 and the center hub 32 are each fabricated in two half sections, i.e., an upper section and a lower section. The upper section comprises both the outer shell upper section and the center hub upper half section, as these two sections are joined by the support struts 36 that extend between the outer shell upper section and the center hub upper section. The lower half section similarly comprises both the outer shell lower half section and the center hub lower half section with struts 36 connecting the two lower half sections.

Figure 2:
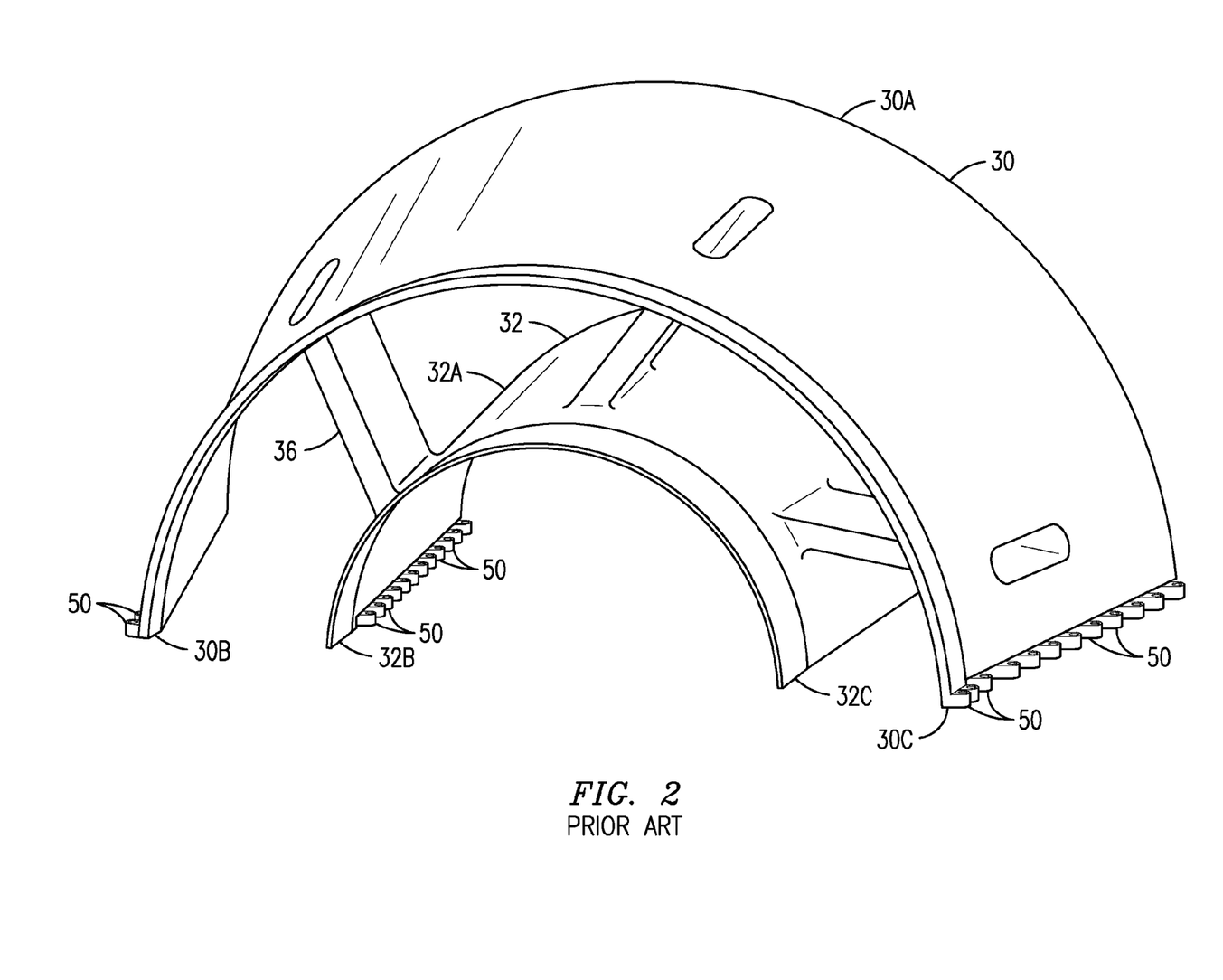
FIG. 2 is a view of certain pertinent prior art components of the exhaust casing of the gas turbine engine illustrated in FIG. 1.

As illustrated in FIG. 2, an upper half section 30A of the outer shell 30 comprises a first and a second row of flanges 50 (also referred to as scalloped flanges due to their shape) extending outwardly along respective edges 30B and 30C of the upper half section 30A.

On an upper half section 32A of the center hub 32, a third and a fourth row of flanges 50 extend inwardly along respective edges 32B and 32C.

The lower half sections of the outer shell 30 and the center hub 32 (not illustrated) are similarly configured with flanges for contacting the flanges 50 of the upper half sections 30A and 32A. A coupling element, such as a bolt/nut combination, is inserted into through-holes or openings in each pair of contacting flanges 50 for coupling the upper and lower half sections of the outer shell 30 and the center hub 32.

BRIEF DESCRIPTION OF THE DRAWINGS

The invention is explained in the following description in view of the drawings that show.

DETAILED DESCRIPTION OF THE INVENTION

When the diffuser upper half sections of the outer shell 30 and the center hub 32 are brought into contact with the corresponding lower half sections to complete the assembly (or reassembly for field operations) of the diffuser, the through-hole openings in each flange 50 extending from the upper sections 30A and 32A must be brought into accurate alignment with the through-hole openings in the corresponding flanges extending from the outer shell and center hub of the lower sections. Accurate through-hole alignment is required to permit placement of a coupling element or bolt through the aligned holes. Threading a nut onto the bolt fixedly couples the upper half of both the outer shell and the center hub to the respective lower half of each structure.

The temperature of exhaust gases flowing from the turbine into the exhaust casing can be as high as 1,100 degrees F. Temperatures in this range can cause material expansion and deformations in the components of the exhaust casing such as the outer shell and the center hub.

When the upper half of the outer shell/center hub is separated from the lower half, for example to perform maintenance on interior components of the gas turbine, accurate alignment is typically not realized when the two halve are later mated during reassembly. This misalignment is due to these structural deformations. The struts assist in maintaining the required alignment, but they alone are not sufficient.

Figure 3:
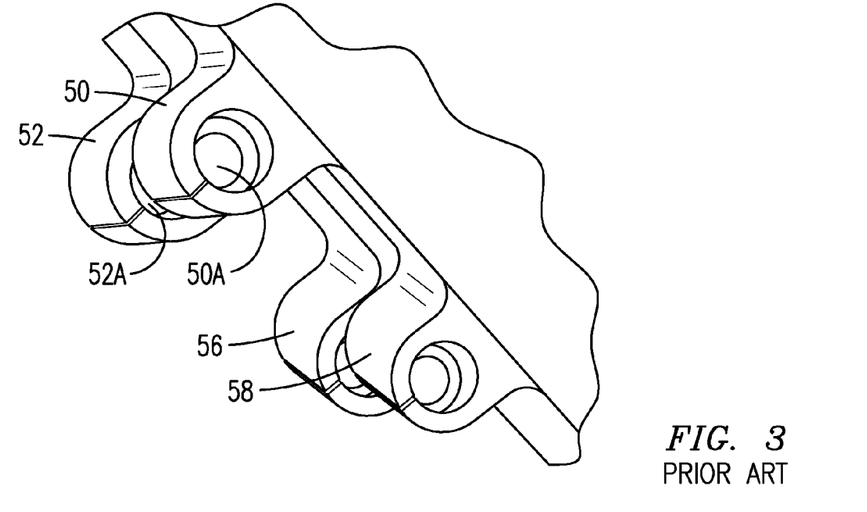
FIG. 3 is a view illustrating misalignment of flanges in structures of the exhaust gas casing of FIG. 2 as is experienced in the prior art.

FIG. 3 illustrates misalignment of an upper flange 50 relative to a lower flange 52, that is, misalignment between an through-hole opening 50A in the upper flange 50 and a through-hole opening 52A in the lower flange 52. As can be seen, flanges 56 and 58 are also misaligned.

According to the prior art, when the two halves of the diffuser components are brought together it is commonly necessary to use hydraulic jacks to force the two halves, more specifically their flanges and the through-hole openings within each flange, into alignment.

To avoid this misalignment at reassembly, prior to separating the two halves, a length of channel iron may be welded to the outer shell 30 and the center hub 32 proximate each of the four rows of flanges. The channel iron may hold the position of these flanges after separation of the two halves and thereby maintain the necessary alignment for reassembly.

These prior art techniques for maintaining alignment prior to separation of the two halves, or for forcing alignment when the two halves are brought together during reassembly are both expensive and time consuming. Welding a length of channel iron requires additional time and resources and can introduce new, unwanted, stresses on the outer shell and center hub. A simpler, less expensive and faster technique for achieving alignment of the flanges and their through-hole openings is desired.

To solve these misalignment problems, the present invention contemplates use of a compact tool that uses reactionary pushing/pulling forces exerted on mating flanges to align one or more through-holes or bolt holes in a first flange with one or more through-holes or bolt holes in a second flange. For example, the tool can be used on flanges extending along edges of the upper and lower halves of the outer shell and the center hub of a gas turbine diffuser.

Generally, a first structural member comprises proximate first and second flanges each defining a through-hole opening. Similarly, a second structural member comprises proximate third and fourth flanges each also defining a through-hole opening.

The tool of the present invention is inserted through the opening defined in the first flange and the opening defined in the third flange, then manipulated to align these openings. This operation also aligns the opening in the second flange with the opening in the fourth flange. A coupling element (e.g., a bolt and mating nut) can now be inserted through the aligned openings of the second and fourth flanges. Continued repetition of this operation of aligning two flange openings and inserting a coupling element into proximate flange openings that have also been aligned eventually brings all flange openings into alignment and allows coupling of the aligned flange openings. This action couples the first and second structural members together. Alignment of flanges on the upper and lower halves of the outer shell and of the center hub of a gas turbine exhaust casing can benefit from use of this tool.

When used to align flange openings in the upper and lower halves of the outer shell and the center hub, the inventors have determined that at least about one or two outboard openings (i.e., on each side of a flange carrying the tool of the present invention) may be sufficiently aligned to permit receiving a bolt and mating nut. However, it is recognized that this statement is dependent on the amount of distortion in the two flanges. In fact in a region of several linearly-arranged flanges, it may be necessary to use a tool in alternate flange openings. Two tools can be used to accomplish this operation to align the flange openings between the two tools. The aligned openings will be aligned to receive a bolt and mating nut.

Further, the flange openings spaced farther from the tools may also be aligned by action of the two tools. If there is minimal flange distortion several openings can be aligned with only one tool. Several tools can be installed on the upper and lower flanges to allow the coupling process to proceed more efficiently and quickly. Thus as can be seen, the number of tools required and the time taken to align the flanges and couple the upper and lower halves of the outer shell and the center hub are determined by the degree of distortion in the upper and lower halves.

Because the present invention can exert substantial forces, it eliminates the need for hydraulic jacks to align the upper and lower flanges on the upper and lower diffusion halves. The jacks are sometimes situated at steep angles to move the flanges left, right, forward, and backward into alignment. They can then slip from the flange and cause injury. It is also difficult to position the jacks to apply forces in the desired directions especially on the center hub flanges as adequate space may not be available to safely and effectively apply these forces in the desired direction. Also, the space between the center hub and the outer shell is restricted and presents an awkward work zone for personnel, raising additional personnel safety concerns. Use of the tool of the present invention significantly reduces the likelihood of such injuries. The tool of the present invention also reduces gas turbine field reassembly time when used to align the flanges on the upper and lower halves of the outer shell and center hub.

Figure 4:
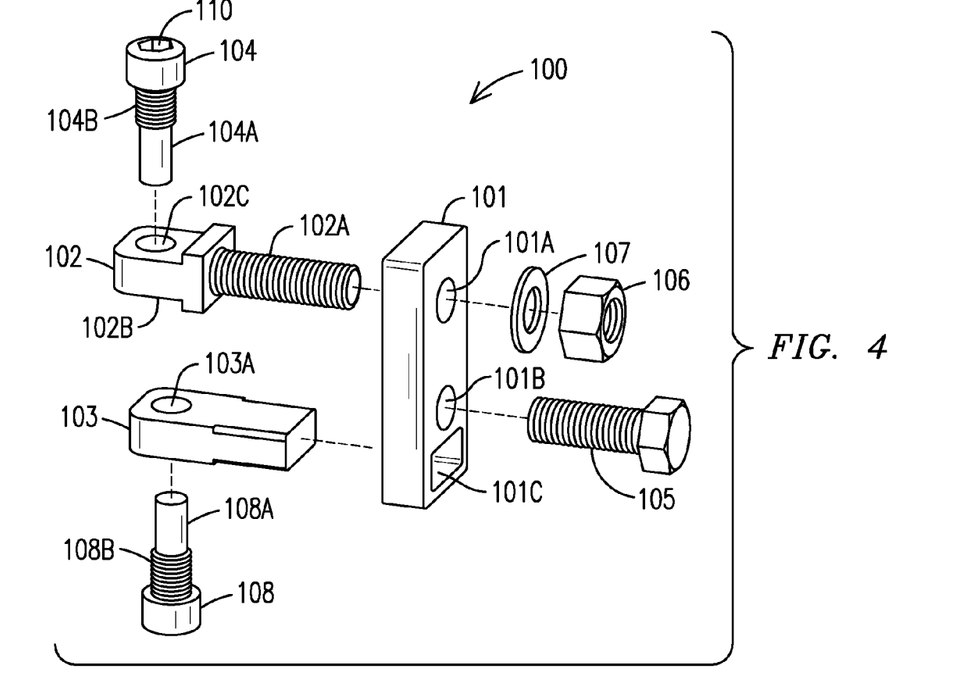
FIG. 4 is an exploded view of the alignment tool of the present invention.

FIG. 4 illustrates an exploded view of an alignment tool 100 of the present invention, comprising a back plate 101 that defines a through-hole opening 101A and a threaded opening 101B. A threaded segment 102A of a lug 102 is received within the through-hole opening 101A. A nut 106 and washer 107 are threaded onto the threaded segment 102A to securely hold the lug 102 in the back plate 101.

The lug 102 further comprises a plate 102B affixed to or formed integrally with the threaded segment 102A and defining an opening 102C therein. A pin 104 is threaded into the opening 102C from above (as the tool 100 oriented in FIG. 4). The lug 102 comprises a hardened steel material, for example, to resist thread galling as the nut 106 is threaded onto the threaded segment 102A. As explained below, sizable forces are exerted on the lug 102 as the flanges are brought into alignment.

The back plate 101 further defines an opening 101C for receiving a lug 103. In one embodiment the lug 103 is welded into the opening 101C. A bolt 105 (in one embodiment comprising a hex head bolt as illustrated) is threaded into the threaded opening 101B. A pin 108 is threaded upwardly (as the tool 100 is oriented in FIG. 4) into an opening 103A defined in the lug 103.

Continuing with FIG. 4, the upper and lower (i.e., as the tool 100 is oriented in FIG. 4) pins 104 and 108 each comprise a blank or unthreaded segment 104A and 108A and a threaded segment 104B and 108B. The pins 104 and 108 are threaded into their respective receiving openings 102C and 103A. For this purpose, each pin 104 and 108 defines a respective opening 110 and 111 (see also FIG. 6) in a top surface thereof. In one embodiment the opening is sized and shaped to accept a hex-shaped driver for threading each pin 104 and 108 into its respective opening 102C and 103A.

In another embodiment the threaded segment 104B and 108B comprises a quick-lock thread set having a minimal number of threads to permit engagement of the pin 104, 108 into its respective opening 102C, 103A with minimal rotation of the pin 104, 108. For example, a quarter turn of the pin 104, 108 locks the pin into its respective receiving opening 102C and 103A.

The unthreaded segments 104A/108A of each pin extend from the respective receiving lug 102 and 103 and are received in openings to be aligned as described below.

Figure 5:
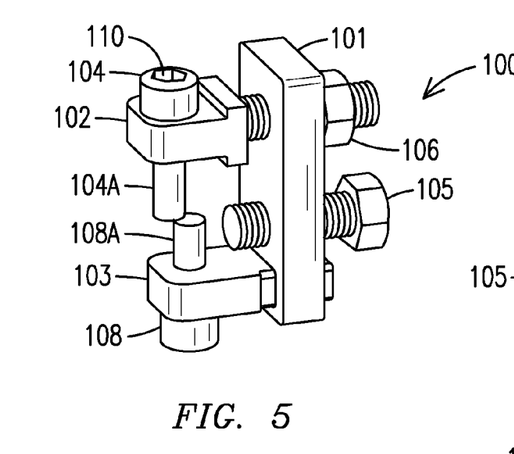
FIG. 5 is a perspective view of an assembled alignment tool.

FIG. 5 illustrates the alignment tool 100 with all its components in place. As can be seen, with the pin 104 threaded into the opening 102C defined in the lug 102, the unthreaded or blank segment 104A extends beyond a lower surface of the plate 102B of the lug 102. Similarly, the pin 108 is threaded into the opening 103A of the lug 103, with the unthreaded or blank segment 108A extending beyond an upper surface of the lug 103.

Figure 7:
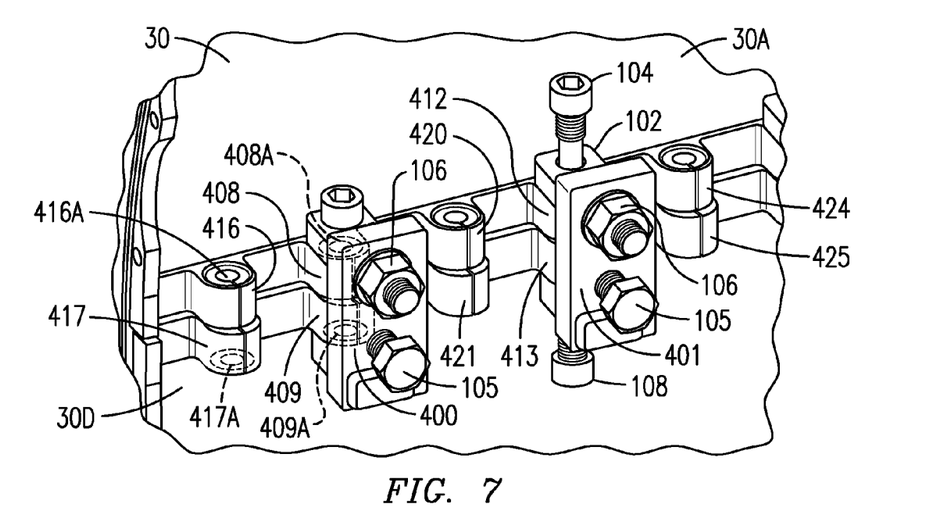
FIGS. 7 and 8 are close-up views of alignment tools installed on flanges for aligning the flange openings.

As illustrated in FIG. 7, to align flange openings, the blank pin segment 104A of a tool 400 is received within an upper flange opening 408A and the blank pin segment 108A is received within a lower flange opening 409A.

With continuing reference to FIG. 7, the bolt 105 is tightened snug against a bottom flange 409 to create a fulcrum for a tool 400. The bolt 105 is not turned under load conditions and cannot therefore exert any substantial forces on the pin 108 or the flange 409 through which the pin 108 passes.

To apply a force to align the flanges 408 and 409, the nut 106 is turned under load to pull the upper flange 408 toward the tool 400.

Figure 8:
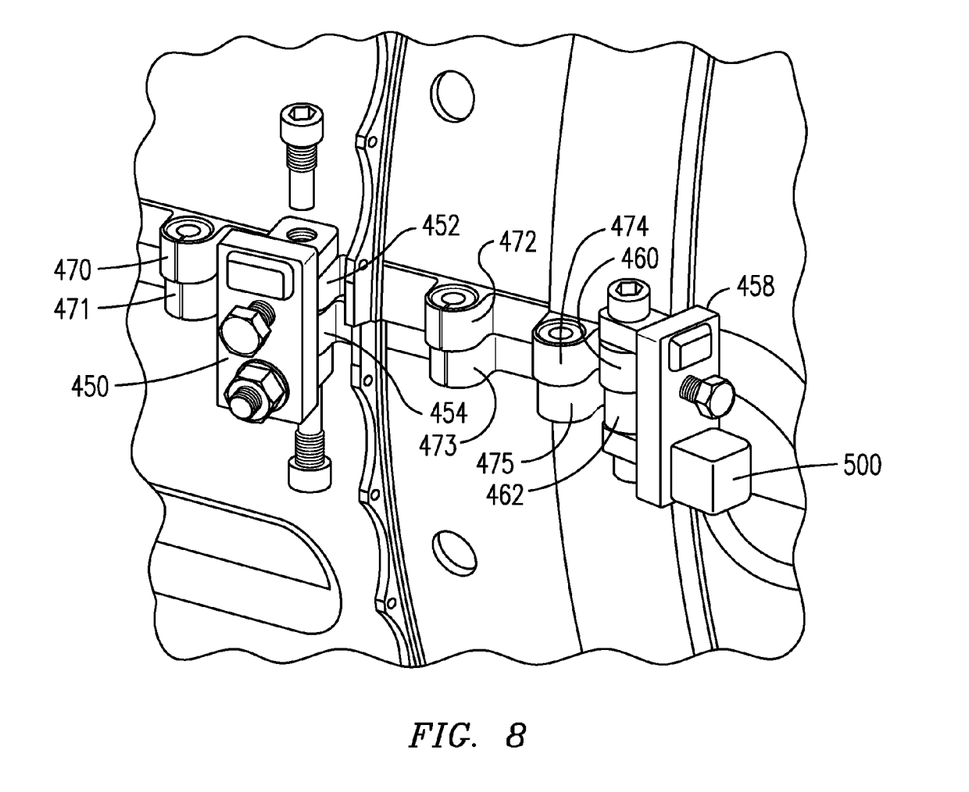

In another embodiment a hydraulic device 500 may be used to turn the nut 106 or otherwise provide the necessary force to pull the upper flange 408 toward the tool 400 as shown in FIG. 8.

Thus by pulling the upper flange 408 outwardly or toward the tool 400, the upper and lower flanges 408 and 409 are aligned. More specifically the openings 408A and 409A are aligned. The flanges 416 and 417 (specifically the openings 416A and 417A) outboard to the left of the flanges 408 and 409 are also now aligned for receiving a coupling element (such as a bolt and mating nut) for insertion into flanges 416 and 417 for coupling them together.

After operation of a tool 401, the flanges 420 and 421 (see FIG. 7) located between the flanges 409/409 and 412/413, are also now aligned for receiving a coupling element.

In a situation where it is necessary to pull a lower flange outwardly, such as lower flanges 471, 473, and 475 of FIG. 8 to align with the respective upper flanges 470, 472, and 474, a tool 450 is inverted from the FIG. 4 orientation, i.e., placing the bolt 105 above the nut 106. The nut 106 is tightened to pull the lower flanges 471, 473, and 475 outwardly toward the tool 450. A tool 458 may also be required to align the flanges 470/471, 472/473, and 474/475. Couplers can then be inserted into any openings that are aligned by action of the tools 450 and 458. Additional tools may be required or the tools 450 and 458 may be relocated to align additional flanges.

Note also that the tool 450 is placed to align flange openings in axially-directed flanges and the tool 458 is placed to align flange openings in radially-directed flanges.

Thus as described, the tool can be used in either of two vertical orientations to exert a pulling force on either an upper flange or a lower flange to align upper and lower flanges.

Figure 6:
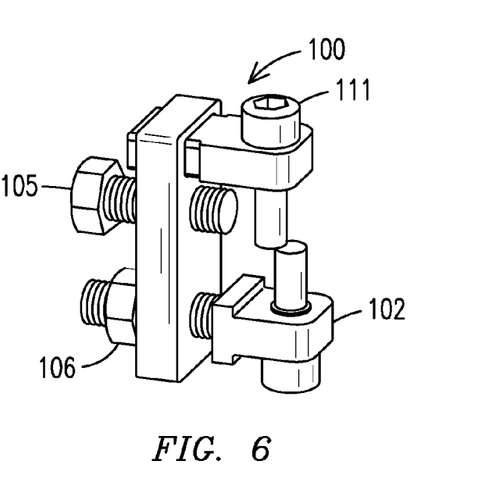
FIG. 6 is a perspective view of the assembled alignment tool in an inverted orientation relative to the tool of FIG. 5.

FIG. 6 also illustrates the tool 100 in an inverted orientation relative to the tool 100 in FIG. 5.

Returning to FIG. 7, it illustrates two alignment tools 400 and 401, each constructed as described above, mated with the respective upper/lower flanges 408/409 and 412/413. Additional upper and lower flanges 416/417, 420/421, 424/425, are also illustrated. Both the tools 400 and 401 are oriented to pull the upper flanges 416, 408, 420, 412, and 424 outwardly. This action aligns the openings in the flanges 416/417, 408/409, 420/421, 412/413, and 424/425 for receiving a coupling element and coupling the upper half 30A to the lower half 30D.

Depending on the degree of misalignment between the upper and lower flanges in FIG. 7, additional tools, spaced apart as required by the degree of misalignment, may be required to align all upper and lower flanges along the upper and lower halves 30A and 30D of the outer shell 30.

Generally, outwardly-directed forces are exerted by tightening the nuts 106. But since the tool 100 can be used in either of two vertical orientations, depending on that orientation, tightening the nuts 106 can draw either the upper or lower flanges toward the tool.

Thus as can be appreciated, placement of the alignment tool within an upper and lower flange causes outboard proximate flanges to be aligned, thereby permitting coupling of these aligned flanges and fixing the upper and lower halves of the outer shell and the center hub together. It has been determined that a misalignment of about one-half inch in the flanges on each side of the alignment tool can be brought into alignment by the tool. Once aligned, a coupling device can be inserted in the openings couple the flanges together.

It is expected that a tool will be inserted on each side of the openings that are to be aligned, the tools manipulated to align the openings, a coupler installed in the aligned holes, the tools removed and inserted into two different holes for aligning the openings.

Figure 9:
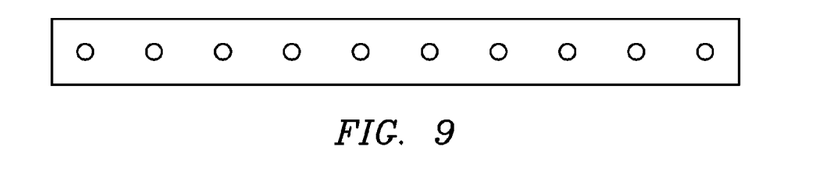
FIG. 9 and FIG. 10 illustrate respective top and front views of flanges for which the tool of the present invention can be used to align flange openings.
Figure 10:
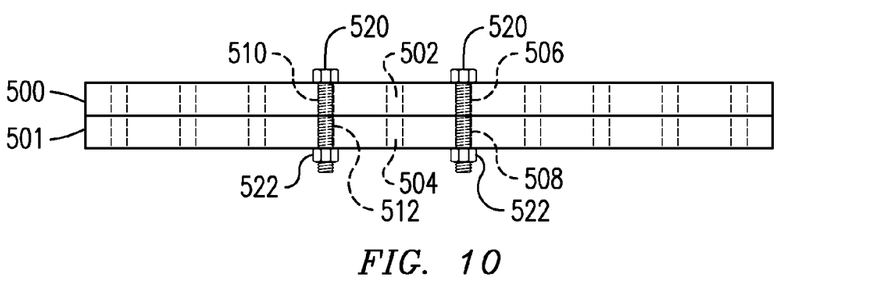

The tool of the present invention can also be used on a non-scalloped flange, such as the flanges 500 and 501 illustrated in a top view in FIG. 9 and a front view in FIG. 10. As described above, the tool (not illustrated in FIG. 9 or 10) is inserted into openings 502 and 504, for example, to align openings 506/508 and 510/512 that are proximate the aligned openings 502 and 504. When aligned a fastener (a bolt 520 for example) can be inserted into the openings 506/508 and 510/512 and mated with a nut 522. Depending on a material of the flanges 500 and 501 and the degree of distortion and misalignment, several outboard openings on each side of the openings 502 and 504 may be aligned to permit insertion of fasteners.

Figure 11:
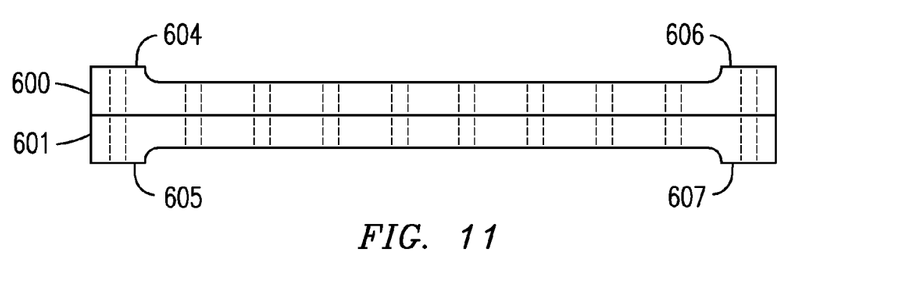
FIG. 11 illustrates a front view of flanges for which the tool of the present invention can be used to align the flange openings.

FIG. 11 illustrates another application for the tool of the present invention. The tool can be used to align openings in flanges 600 and 601, which comprise a reinforced material region proximate end openings 604, 605, 606 and 607.

The various embodiments of the invention have been described with reference to the pins 104, 108 extending from the lugs 102, 103 and inserted into openings in flanges or structural members for aligning the flanges to receive a coupler. In another embodiment in lieu of the pins, one or both of the lugs 102, 103 are temporarily welded to the flanges or structural members. After the coupler is installed, the weld is removed.

Although in reference to certain figures and descriptions, the various components and openings of the tool may be referred to as in an up/down relationship, this relationship is not required for use of the tool. The direction of the tool components and openings defined in those components depends on the orientation of the holes to be aligned. The tool of the present invention can also be oriented in a horizontal direction to align flanges disposed in a vertical direction.

While preferred embodiments of the present invention are described and illustrated herein, it will be obvious that such embodiments are provided by way of example only. Numerous variations, changes and substitutions will occur to those of skill in the art without departing from the invention. Accordingly, it is intended that the invention be limited only by the spirit and scope of the appended claims.

The invention claimed is:

1. An alignment tool for aligning a first structural opening in a first member with a second structural opening in a second member, the first and second members to be coupled by insertion of a fastener through the first and second structural openings, the tool comprising:
   a back plate;
   first and second spaced-apart lugs each coupled to the back plate each extending in a same direction from the back plate, the first lug adjustably coupled to the back plate for linear displacement relative to the back plate and the second lug fixedly coupled to the back plate;
   a first pin coupled to the first lug and extending in a first direction from the first lug for receiving within a third structural opening in the first member;
   a second pin coupled to the second lug and extending in a second direction from the second lug for receiving within a fourth structural opening in the second member, the first direction opposite the second direction; and
   the first lug adjustable relative to the back plate for changing a distance between the first pin and the back plate to align the first and second structural openings, thereby permitting insertion of a fastener through the first and second structural openings to couple the first and second members.

2. The alignment tool of claim 1 wherein the first pin coupled to the first lug comprises the first pin received within a first lug opening defined in the first lug, and wherein the second pin coupled to the second lug comprises the second pin received within a second lug opening defined in the second lug.

3. The alignment tool of claim 2 wherein each of the first and second pins comprises a threaded segment and a blank segment, the threaded segment threadably engaged in the respective first and second lug openings and the blank segment received within the respective third and fourth structural openings.

4. The alignment tool of claim 1 wherein the back plate defines a back plate opening, the first lug defines a first lug opening at a first end and a threaded segment at a second end, the threaded segment received within the back plate opening, a nut for mating with the threaded segment, and wherein rotation of the nut on the threaded segment linearly displaces the first lug and the first pin relative to the back plate and thereby displaces the third structural opening relative to the back plate for aligning the first and second structural openings.

5. The alignment tool of claim 1 wherein the first and second lugs are oriented substantially perpendicular to the back plate.

6. The alignment tool of claim 1 wherein the third structural opening is proximate the first structural opening and the fourth structural opening is proximate the second structural opening.

7. The alignment tool of claim 1 the alignment tool further comprising a hydraulic device engaged with the first lug for adjusting the first pin toward the back plate.

8. The alignment tool of claim 1 wherein the back plate defines first and second back plate openings, the second lug received within the first back plate opening and fixedly coupled to the back plate, a threaded bolt threadably received within the second back plate opening, wherein rotation of the threaded bolt places an end of the bolt into contact with the second member to create a fulcrum for the alignment tool.

9. The alignment tool of claim 8 wherein the second lug is welded in the first back plate opening.

10. The alignment tool of claim 1 wherein the first and second members comprise respective upper and lower halves of a gas turbine exhaust diffuser and the fastener comprises a threaded member for mating with a threaded nut.

11. The alignment tool of claim 10 wherein the upper and lower halves of the gas turbine exhaust diffuser further comprise upper and lower halves of an outer shell and upper and lower halves of a center hub coupled to the outer shell through support struts, and wherein flanges are disposed axially along an outer surface of the upper half of the outer shell for coupling to flanges disposed axially along an outer surface of the lower half of the outer shell, and wherein flanges are disposed axially along an inner surface of the upper half of the center hub for coupling to flanges disposed axially along an inner surface of the lower half of the center hub, and wherein the first, second, third and fourth structural openings are defined in the flanges.

12. The alignment tool of claim 11 wherein each of the flanges comprises a scalloped flange.

13. The alignment tool of claim 1 wherein the back plate is oriented vertically for vertical alignment of the structural openings or the back plate is oriented horizontally for horizontal alignment of the structural openings.

14. An alignment tool for aligning a first structural opening in a first member with a second structural opening in a second member, the first and second members to be coupled by insertion of a fastener through the first and second structural openings, the tool comprising:
   a back plate;
   a first lug defining a first lug opening therein and adjustably coupled to the back plate for linear displacement relative to the back plate;
   a second lug defining a second lug opening therein, the second lug fixedly mated to the back plate;
   a first pin received within the first lug opening and extending in a first direction from the first lug opening for receiving within a third structural opening in the first member, the third structural opening proximate the first structural opening;

the first lug adjustably coupled to the back plate such that a distance between the back plate and the first pin is adjustable;

a second pin received within the second lug opening and extending in a second direction from the second lug opening for receiving within a fourth structural opening in the second member, the fourth structural opening proximate the second structural opening, the first direction opposite the second direction; and wherein reducing the distance between the back plate and the first pin displaces the third structural opening toward the back plate to align the first and second structural openings thereby permitting insertion of a fastener through the first and second structural openings to couple the first and second members.

15. The alignment tool of claim 14 wherein the back plate defines a first back plate opening and the first lug defines the first lug opening at a first end and a threaded segment at a second end, the threaded segment received within the first back plate opening, a nut for mating with the threaded segment, and wherein rotation of the nut on the threaded segment displaces the first pin relative to the back plate and thereby displaces the third structural opening relative to the back plate for aligning the first and second structural openings.

16. The alignment tool of claim 14 wherein the first and second members comprise respective upper and lower halves of a gas turbine exhaust diffuser outer shell or comprise respective upper and lower halves of a gas turbine exhaust diffuser center hub.

17. The alignment tool of claim 14 wherein each of the first and second pins comprises a threaded segment and a blank segment, wherein the threaded segment mates with corresponding threads of the respective first and second lug openings and the blank segment extends from the respective first and second lugs for engaging the respective third and fourth structural openings.

18. The alignment tool of claim 14, further comprising a bolt threaded through the back plate to make fulcrum contact with the second member.

19. The alignment tool of claim 14, further comprising a hydraulic device engaged to tension the first lug.

* * * * *